United States Patent
Drapeau et al.

(10) Patent No.: US 11,372,084 B2
(45) Date of Patent: Jun. 28, 2022

(54) TARGET SIGNAL GENERATION

(71) Applicant: Raytheon Company, Waltham, MA (US)

(72) Inventors: John E. Drapeau, Sahuarita, AZ (US); Michael R. Beylor, Vail, AZ (US); Ryan D. Dewitt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 342 days.

(21) Appl. No.: 16/682,506

(22) Filed: Nov. 13, 2019

(65) Prior Publication Data

US 2021/0141056 A1    May 13, 2021

(51) Int. Cl.
*G01S 7/40*    (2006.01)
*G06F 1/02*    (2006.01)

(52) U.S. Cl.
CPC ............ *G01S 7/4052* (2013.01); *G06F 1/022* (2013.01); *G01S 7/4073* (2021.05)

(58) Field of Classification Search
CPC ....... G01S 7/4052; G01S 7/4073; G06F 1/022
See application file for complete search history.

(56) References Cited

U.S. PATENT DOCUMENTS

| | | | | |
|---|---|---|---|---|
| 5,598,437 A | * | 1/1997 | Gourse | H04L 27/2039 375/279 |
| 5,652,534 A | * | 7/1997 | Taylor | H03K 5/13 327/115 |
| 5,818,384 A | * | 10/1998 | Nishri | G01S 7/282 342/174 |
| 6,028,548 A | * | 2/2000 | Farmer | G01S 7/36 342/72 |
| 6,054,948 A | * | 4/2000 | Dean | H01Q 21/0025 342/372 |
| 9,479,232 B1 | * | 10/2016 | Loui | H04B 7/0617 |
| 2019/0181964 A1 | * | 6/2019 | Christoffers | G01S 7/4021 |

FOREIGN PATENT DOCUMENTS

WO    WO 2019/147417 A1    8/2019

* cited by examiner

*Primary Examiner* — Donald H B Braswell
(74) *Attorney, Agent, or Firm* — Daly, Crowley, Mofford & Durkee, LLP (57) ABSTRACT

Methods and apparatus for generating a target signal with desired phase shift information. In embodiments, a system receives an input target signal having a first frequency and combines the input target signal with an oscillator signal to generate a first output signal having a second frequency. The oscillator signal is generated using a digital component that imparts phase-shift information into the oscillator signal. The first output signal is combined with a fixed frequency oscillator signal to generate a second output signal corresponding to a signal reflected from a target.

20 Claims, 7 Drawing Sheets

TARGET SIGNAL GENERATION

BACKGROUND

As is known in the art, radar systems transmit a signal having certain frequency, amplitude and phase characteristics and receive a signal reflected by one or more targets. As is also known, it is desirable to test a radar system prior to deployment in the field. In order to simulate a target and/or interferer signal, the phase of the simulated return signal is altered. Conventional systems for generating simulated target return include phase shifting using an analog phase shifter that may be limited by phase step size, linearity, repeatability, cost, and size. Other conventional systems require multiple coherent channels which may not be easily implemented in legacy systems that can rely on packaged phase shifters, vector modulators, and various transmission delay lines to adjust phase. These types of phase-varying components have inherently limited bandwidth and coarse phase step resolution. In addition, the phase offsets introduced vary over frequency, time and temperature and in multiple channel systems devices drift from channel to channel. This drift requires calibration on a regular, e.g., daily, basis to correct. The above signal variations can create errors in the simulated target return signal.

SUMMARY

Embodiments of the invention provide methods and apparatus for simulating signal return from a target to enable testing of radar systems, for example, including the receiver system. Embodiments utilize a super-heterodyne architecture with a direct digital synthesized (DDS) or digital to analog converter (DAC)-based local oscillator (LO) to impart desired phase offsets. With this configuration, the need for an analog phase shifter is eliminated.

Embodiments can provide phase repeatability and accuracy at a level of less than one-hundredth of a degree, as well as phase and frequency modulation of the signal. Embodiments of a target return signal require phase shifts to remain constant across potentially large bandwidths.

In embodiments, a signal simulator includes mixing an input signal with first and second local oscillators (LOs), wherein the first LO is generated using a direct digital synthesizer (DDS) and the second LO is fixed in frequency. In embodiments, the first and second LO signals are derived from a common reference frequency. One LO converts the input signal to some intermediate frequency (IF) that may be selected to minimize spurious signal generation. The other LO returns the signal to the original input frequency. The DDS-based LO also imprints the phase change of the DDS on the output signal to provide desired characteristics on the simulated signal return. In embodiments, the phase of the output signal can be modified by controlling register settings of the DDS. In embodiments, multiple DDS devices can be synchronized across channels to provide low channel-to-channel phase variation with minimal calibration or normalization.

In one aspect, a method comprises: receiving an input target signal having a first frequency; combining the input target signal with an oscillator signal to generate a first output signal having a second frequency, wherein the oscillator signal is generated using a digital component that imparts phase-shift information into the oscillator signal; and combining the first output signal with a fixed frequency oscillator signal to generate a second output signal corresponding to a signal reflected from a target.

A method can include one or more of the following features: the digital component comprises a direct digital synthesizer, the first frequency comprises an intermediate frequency (IF) signal, the input target signal and the oscillator signal are combined using a first frequency mixer, the input target signal is upconverted to the second frequency which comprises an RF signal, the first output signal and the fixed frequency oscillator signal are combined using a second frequency mixer, the first output signal is downconverted, the first output signal is downconverted to an IF signal, the oscillator signal is generated by a first local oscillator and the fixed frequency oscillator signal is generated by a second local oscillator coupled to a reference signal, the digital component comprises a direct digital synthesizer having a phase control register, the direct digital synthesizer includes a frequency control register, and/or the phase control register provides phase control to about $1/100^{th}$ of a degree.

In another aspect, a system comprises: a first signal combiner configured to receive an input target signal having a first frequency and an oscillator signal to generate a first output signal having a second frequency, wherein the oscillator signal is generated using a digital component that imparts phase-shift information into the oscillator signal; and a second signal combiner to combine the first output signal with a fixed frequency oscillator signal to generate a second output signal corresponding to a signal reflected from a target.

A system can further include one or more of the following features: the digital component comprises a direct digital synthesizer, the first frequency comprises an intermediate frequency (IF) signal, the first signal combiner comprises a first frequency mixer, the input target signal is upconverted to the second frequency which comprises an RF signal, the oscillator signal is generated by a first local oscillator and the fixed frequency oscillator signal is generated by a second local oscillator coupled to a reference signal, the digital component comprises a direct digital synthesizer having a phase control register, and/or the phase control register provides phase control to about $1/100^{th}$ of a degree.

BRIEF DESCRIPTION OF THE DRAWINGS

The foregoing features of this invention, as well as the invention itself, may be more fully understood from the following description of the drawings in which.

DETAILED DESCRIPTION

Figure 1:
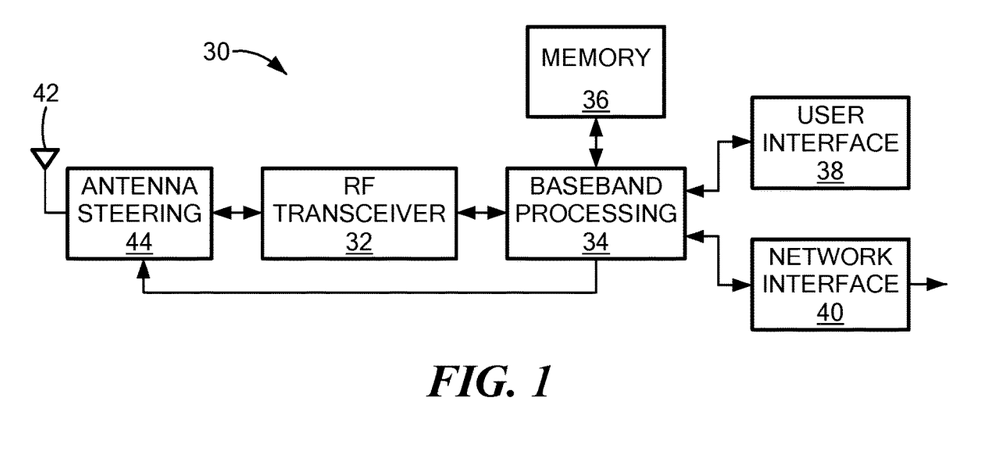
FIG. 1 is a high-level block diagram of radar system that can receive target signals generated in accordance with example embodiments of the invention.

FIG. 1 shows an example radar system including a radar transceiver station 30 that may process target signals generated in accordance with illustrative embodiments of the invention. The transceiver station 30 may include, for example, an RF transceiver 32, a baseband processing unit 34, a memory 36, a user interface 38, and a network interface 40. One or more antennas 42 may be provided to facilitate the transmission and reception of RF signals. RF transceiver 32 may be operative for transmitting radar signals (e.g., radar chirp pulses and/or other types of pulses) during transmit operations and receiving return signals during receive operations, via antenna(s) 42. In at least one implementation, RF transceiver 32 may include a digital receiver/exciter (DREX), although other types of transceivers may alternatively be used. In some embodiments, an antenna steering unit 44 may be provided for use in steering an antenna beam of antenna 42. The antenna steering unit 44 may be controlled by, for example, baseband processing unit 34 or some other control unit.

During a receive operation, a receiver within RF transceiver 32 may amplify and filter a return signal and down convert the return signal to a baseband representation. Baseband processing unit 34 may then process the baseband representation to derive information from the return signal about one or more targets. During a transmit operation, baseband processing unit 34 may instruct RF transceiver 32 when to transmit a pulse. In some implementations, baseband processing unit 34 may also identify a type of pulse that RF transceiver 32 is to transmit (e.g., a linear chirp, a non-linear chirp, etc.). Memory 36 may be operative for storing digital data for transceiver station 30. Memory 36 may include any type of system, device, or component, or combination thereof, that is capable of storing digital information (e.g., user data, computer executable instructions and/or programs, FPGA configuration files, etc.) for access by a processing device or other component.

User interface 38 is an interface that may be used by a user or operator associated with transceiver station 30 to, for example, control operation of the station and/or monitor the target information generated by baseband processing unit 34. User interface 38 may include structures such as, for example, a keyboard, a liquid crystal display (LCD) or monitor, a speaker, a microphone, a mouse, a stylus, a graphical user interface (GUI), and/or any other form of device or structure that allows a user to input information and/or commands to a system or receive information and/or responses from a system. Network interface 40 is operative for providing an interface to one or more external networks for use in transmitting target information to a remote communication entity. For example, in at least one approach, network interface 40 may be used to upload information about targets to one or more external control stations. Network interface 40 may also be used to receive instructions or control information from one or more external control stations. Network interface 40 may support wired and/or wireless communication.

In some implementations, baseband processing unit 34 may include one or more digital processing devices to perform some or all of the baseband processing. The digital processing devices may include, for example, one or more of: a general purpose microprocessor, a digital signal processor (DSP), a controller, a microcontroller, a field programmable gate array (FPGA), a programmable logic array (PLAs), a programmable logic device (PLDs), a reduced instruction set computer (RISC), an application specific integrated circuit (ASIC), and/or others, including combinations of the above. In some implementations, at least some of RF transceiver 32 may also be implemented using digital processing devices.

In embodiments, prior to deployment, for example, of the radar system, it is desirable to evaluate function and operation of the radar system. For example, a simulated target return signal can be provided to the radar system for processing to determine if the radar system properly detects, identifies, tracks, etc., the simulated target return signal. Example embodiments for generating target return signals are described below.

Figure 2:
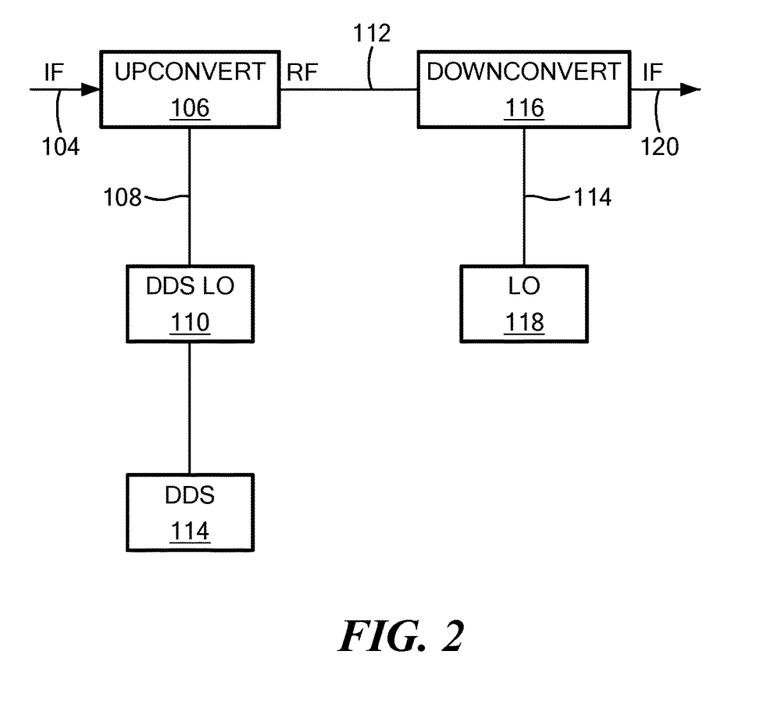
FIG. 2 is a block diagram of an example system to generate target signals with desired phase characteristics.

FIG. 2 is a high-level block diagram of an example signal generation system 100 to generate a simulated target return signal 102 that may be used to test a radar system, for example. An input intermediate frequency (IF) signal 104 is generated having given characteristics in frequency, amplitude and phase for a simulated target return. The input IF signal is provided to an upconverter module 106 along with a first LO signal 108 from a first LO 110 to generate an RF signal 112. In embodiments, the first LO signal 108 is generated by a DDS module 114 that generates desired phase shift characteristics for a simulated target.

A downconverter module 116 receives the RF signal 112 and a second LO signal 114 from a second LO 118 to generate an output IF signal 120. The output IF signal 120 can be provided to a radar or other system to evaluate and test the radar system. It is understood that in other embodiments processing occurs in the opposite direction.

It will be appreciated that it is desirable to test systems prior to deployment in the field, for example. In order to simulate a target for a radar system, a simulated signal will have a selected frequency, phase, and amplitude. Methods for altering frequency and amplitude are well understood and readily implemented. Phase shifting is more challenging and may be limited by phase step size, linearity, and repeatability in some known systems.

Figure 3:
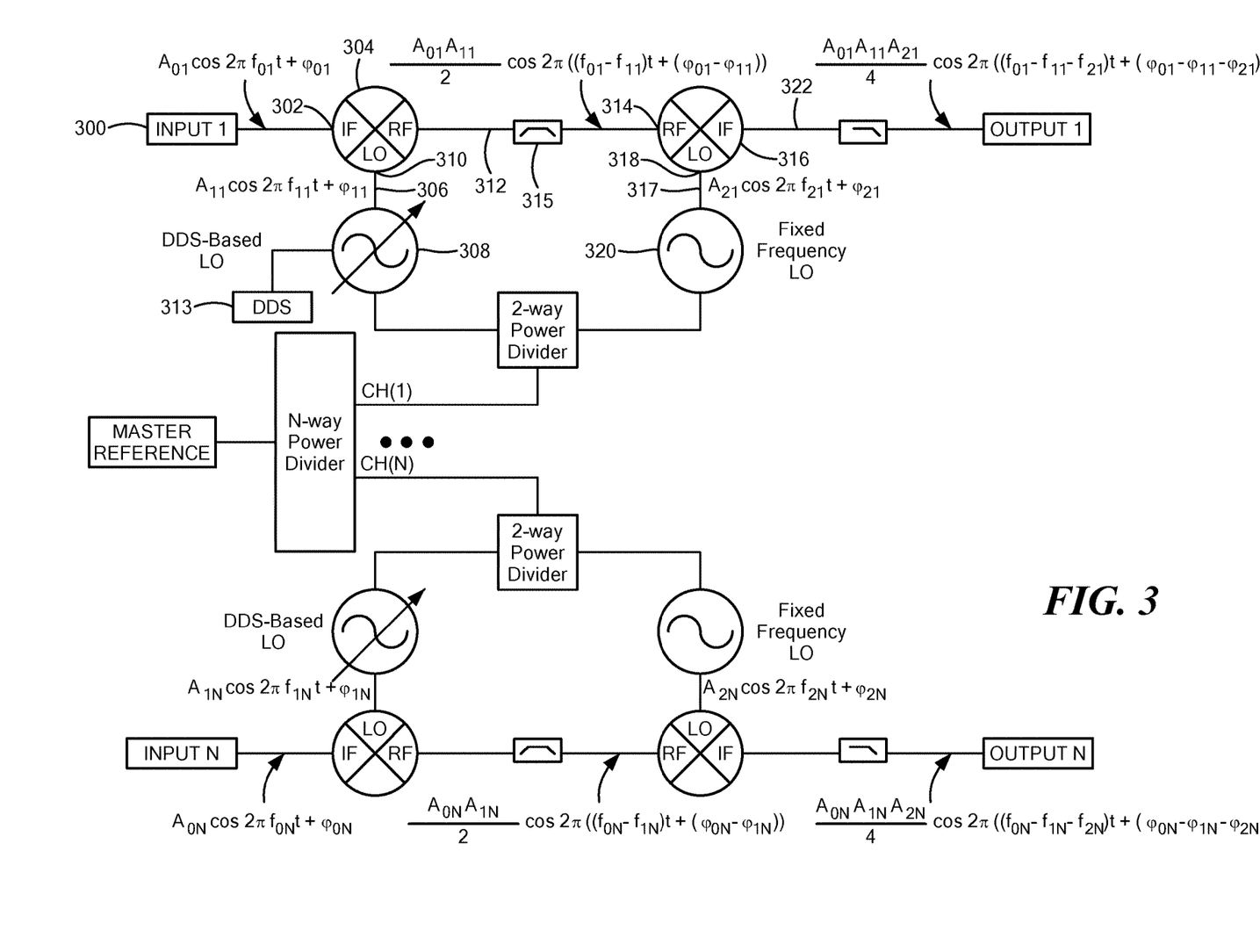
FIG. 3 is a schematic representation of an example implementation of the system of FIG. 2.

FIG. 3 shows a more detailed example implementation of a system for generating simulated target return signals. A first input signal 300 is provided to a first input 302 of a first mixer 304 and a first LO signal 306 of a first LO 308 is provided to a second input 310 of the first mixer 304 which outputs a first output signal 312. The first LO 308 is controlled by a DDS 313 to select the frequency and phase characteristics of the first LO signal 306. The DDS 313 can control phase and frequency shifts for each channel.

The first LO signal is controlled to impart information corresponding to signal return from a selected target. For example, phase information in signal return from a target can provide target directionality. In embodiments, the DDS can program to any phase between 0 and 360 degrees and the step size is determined by the LSB ($360/(2^{\wedge}(16-1))$), which is about 1/100 of a degree.

The bandwidth is limited by the required dynamic range and specific frequency plan. For an array of antennas, the wave front direction is identified by the phase shift between channels.

The first output signal 312 is provided to a first input 314 of a second mixer 316. A second input 318 of the second mixer 316 receives an input signal 317 provided by a second LO 320, which may be a fixed frequency LO. The second mixer 316 generates an output signal 322 that contains the desired phase shift information.

A master timing reference 330 can be provided for the system to ensure that components have an accurate timing reference. For example, the first and second LOs 308, 320 should be synchronized to the same reference to ensure that phase information is accurately added during up conversion and high fidelity down conversion.

While example embodiments are shown and described as adding phase shift information to an IF signal, which is upconverted to RF and then downconverted to IF, it is understood that adding phase shift information is desirable in a variety of applications in any practical frequencies. Example applications include wireless communication systems and commercial radar systems.

In the illustrated embodiment, the first input signal 300 is defined as $A_{01} \cos 2\pi f_{01} t + \varphi_{01}$ and the first LO signal 306 is defined as $A_{11} \cos 2\pi f_{11} t + \varphi_{11}$. After optional filtering 314, the output 312 of the first mixer is defined as $$\frac{A_{01} A_{11}}{2} \text{COS} 2\pi ((f_{01} - f_{11})t + (\varphi_{01} - \varphi_{11})).$$

It is understood that A refers to amplitude, f refers to frequency, and φ refers to phase. The index values i and j uniquely identify the amplitude, frequency and phase component of each signal.

The second mixer 316 receives, at the first input 314, the optionally filtered 315 output 312 of the first mixer 304 and a signal 317 generated by the second LO 320 at the second input 318. In the illustrated embodiment, the second LO signal 317 is defined as $A_{21} \cos 2\pi f_{21} t + \varphi_{21}$ and the second mixer output signal 322 is defined as $$\frac{A_{01} A_{11} A_{21}}{4} \text{COS} 2\pi ((f_{01} - f_{11} - f_{21})t + (\varphi_{01} - \varphi_{11} - \varphi_{21}))$$

As described above, in example embodiments an input signal is mixed with a first LO signal containing actual or simulated phase shift information and a second LO signal with a fixed frequency. The first and second LOs may be derived from a common reference frequency. The fixed frequency LO converts the input signal to a given IF frequency chosen to minimize spurious signal generation. The DDS LO returns the signal to the original input frequency. The DDS LO also imprints the phase change of the DDS on the outputted signal. The phase of the outputted signal can be altered by changing phase register settings of the DDS. In embodiments, multiple DDS devices can be synchronized across channels to provide low channel-to-channel phase variation with minimal calibration or normalization.

Figure 4:
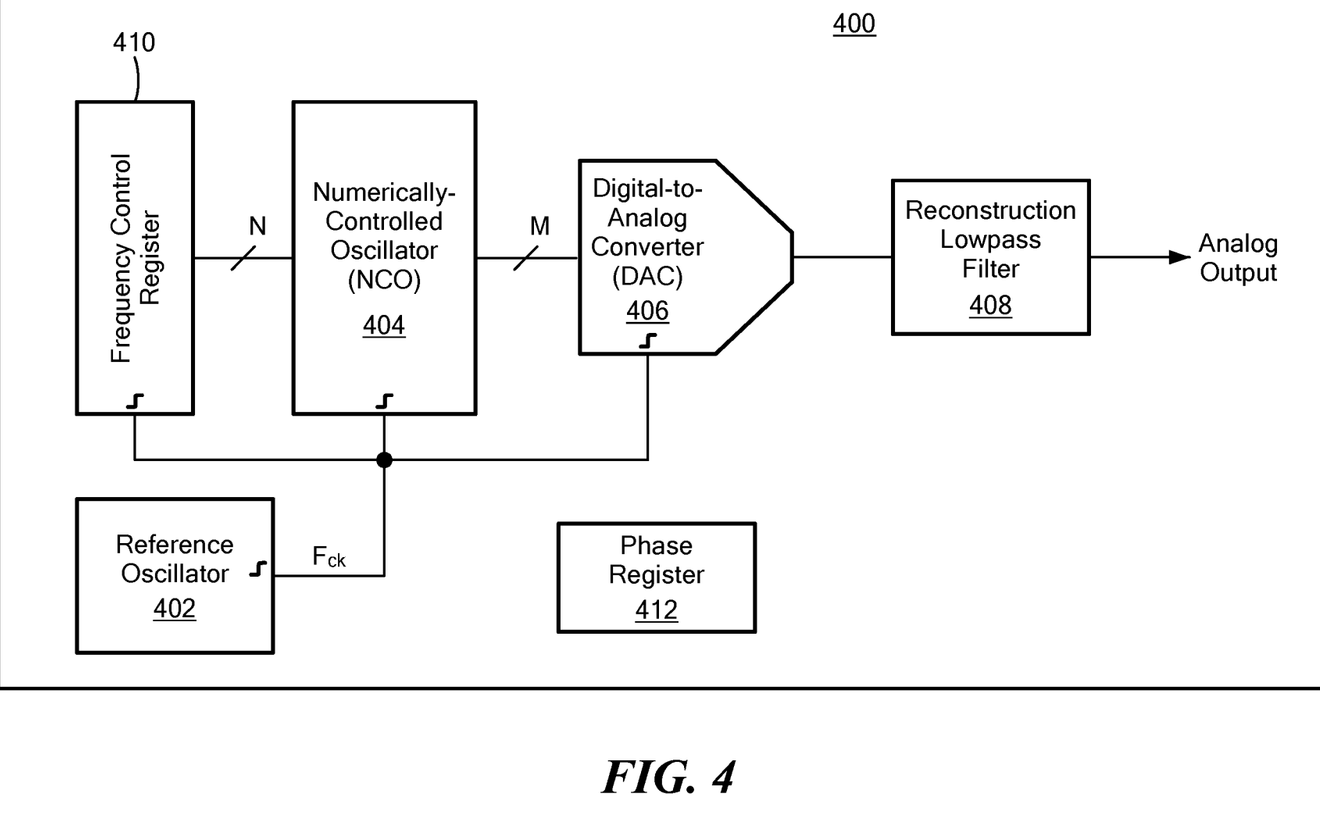
FIG. 4 is a block diagram of an example DDS that can form a part of the system of FIG. 2.

In example embodiments, a DDS 400 is used to control the signal generated by a local oscillator. FIG. 4 shows an example DDS 400 having a frequency reference 402, such as a crystal or oscillator, a numerically controlled oscillator (NCO) 404 and a digital-to-analog (DAC) 406 the output of which can be filtered 408. The DDS 400 can include a frequency control register 410 and a phase control register 412 that can be used to control the DDS output signal.

The reference oscillator 402 provides a reference time base for the system and determines the frequency accuracy of the DDS. The reference oscillator 402 provides a clock to the NCO 404 for generating a discrete-time, quantized version of the desired output waveform, such as a sinusoidal waveform with frequency selected in the frequency control register 410. The DAC 406 converts this signal to an analog output signal. The output reconstruction filter 408 is configured to reject spectral replicas produced in the analog conversion process.

The output frequency of a DDS 400 is determined by the value stored in the frequency control register 410, which in turn controls the NCO 404 phase accumulator step size. Because the NCO 404 operates in the discrete-time domain, it changes frequency instantaneously at the clock edge coincident with a change in the value stored in the frequency control register 410.

The DDS 400 provides high resolution phase change (e.g., less than 1/10 degree) while eliminating an analog phase shifter required in conventional systems. Embodiments having a DDS-based signal generate realize vast improvement in phase resolution over known systems and also increase the capability and fidelity of signals from a target generator. In addition, DDS-based embodiments provide the ability to instantly synchronize the various channels by synchronizing multiple DDSs which is a major improvement over conventional multi-channel architectures.

As used herein, DDS refers to techniques, components, and/or stored instructions for creating waveforms with a fixed frequency reference clock.

Figure 5:
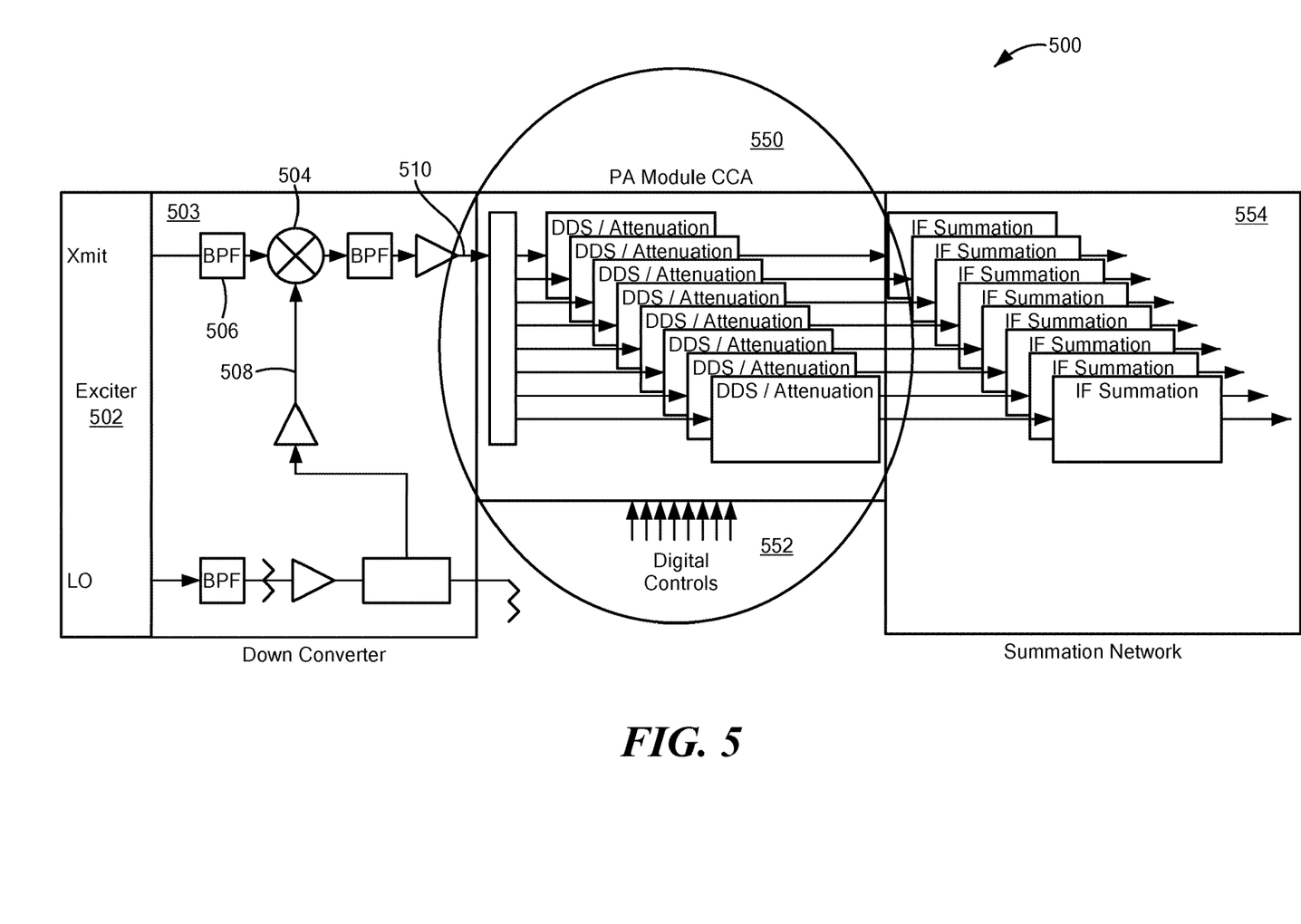
FIG. 5 is a schematic representation of a system including circuit card assemblies for generating simulated target signals.

FIG. 5 shows an example signal generation system 500 for multiple channels. In embodiments, an exciter 502 can be coupled to a downconverter module 503 which receives a RF signal and generates an IF output. The downconverter 503 includes a mixer 504 that receives the RF signal from the exciter 503 after optional bandpass filtering (BPF) 506. A LO signal 508 can optionally be filtered and provided as an input to the mixer 504, which generates a target return signal 510. In embodiments, the mixer 504 output 510 is an IF signal.

Figure 6A:
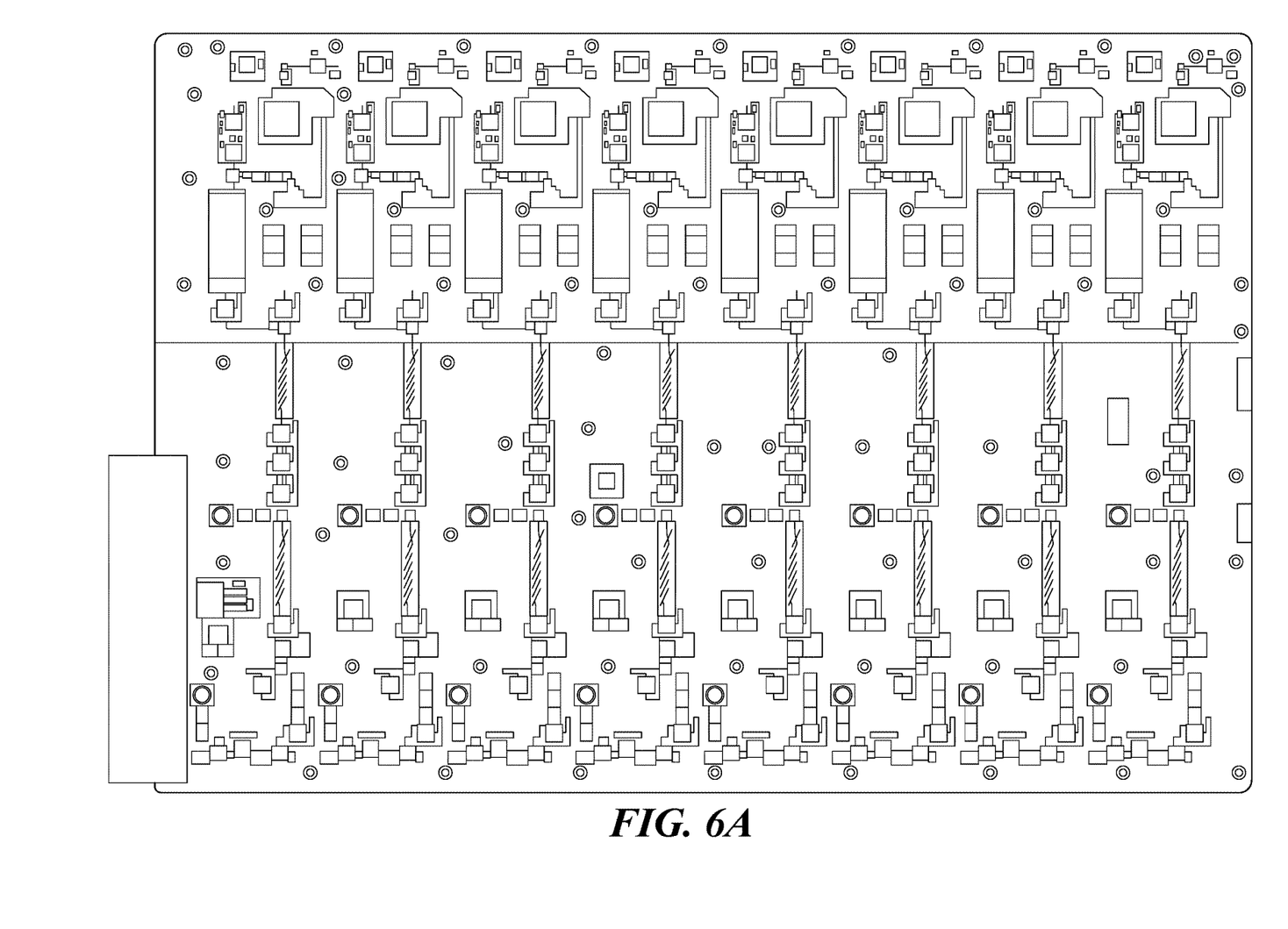
FIGS. 6A and 6B are representations of example circuit card assemblies for the system of FIG. 5.
Figure 6B:
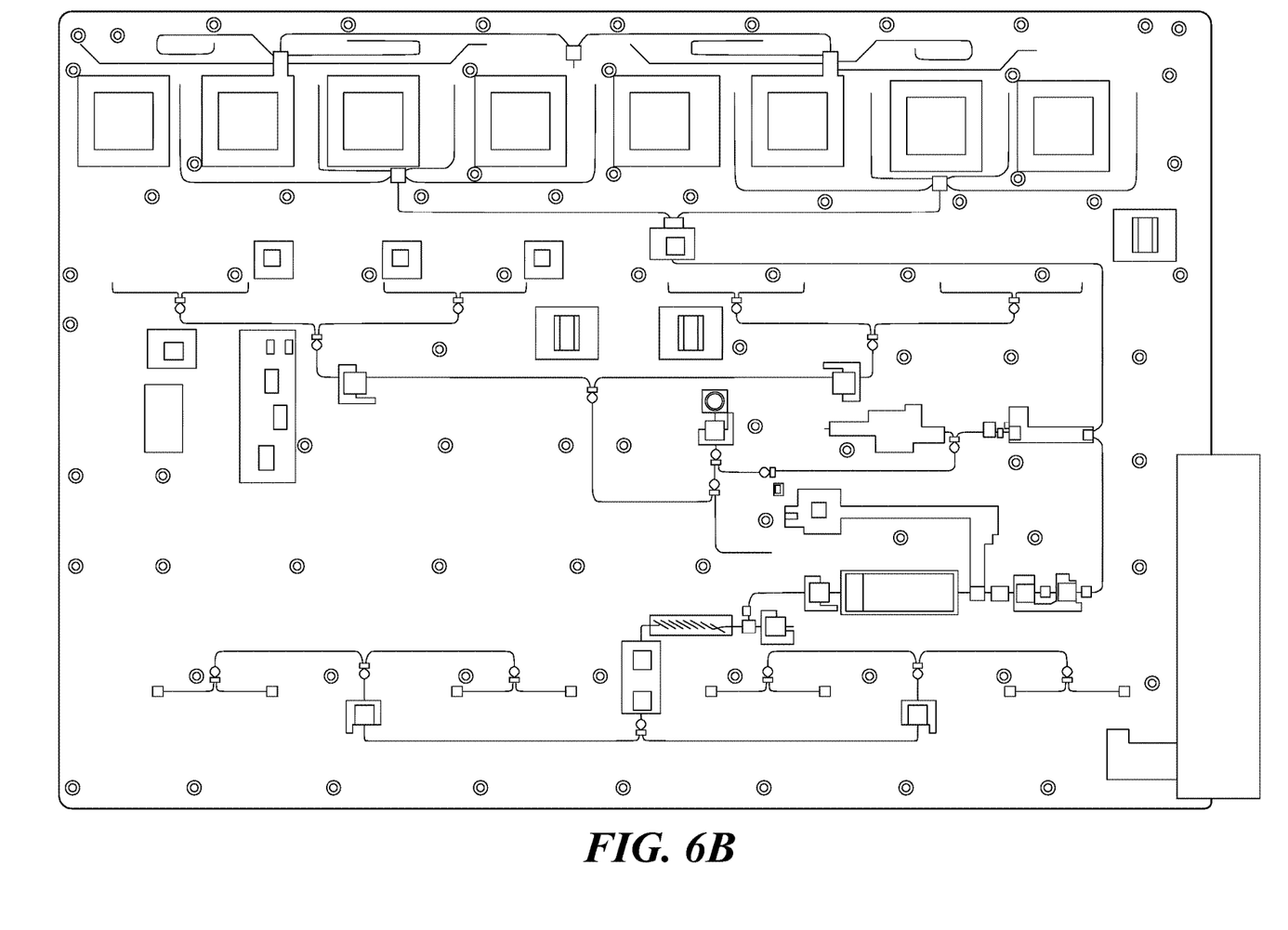

In embodiments, the circuitry of FIGS. 2 and 3 can implemented in one or more circuit card assemblies (CCAs) 550 that receive IF signals from the downconverter module 503. In the illustrated embodiment, eight channels are used. As described above, control signals 552 can be provided to the DDS components to select desired signal characteristics for the target signal. FIG. 6A is a top view and FIG. 6B is a bottom view of an example circuit card assembly with 8 inputs and 8 outputs.

Referring again to FIG. 5, the outputs from the CCAs 550 can be provided to a summation network 554 for processing in manner well known in the art.

Figure 7:
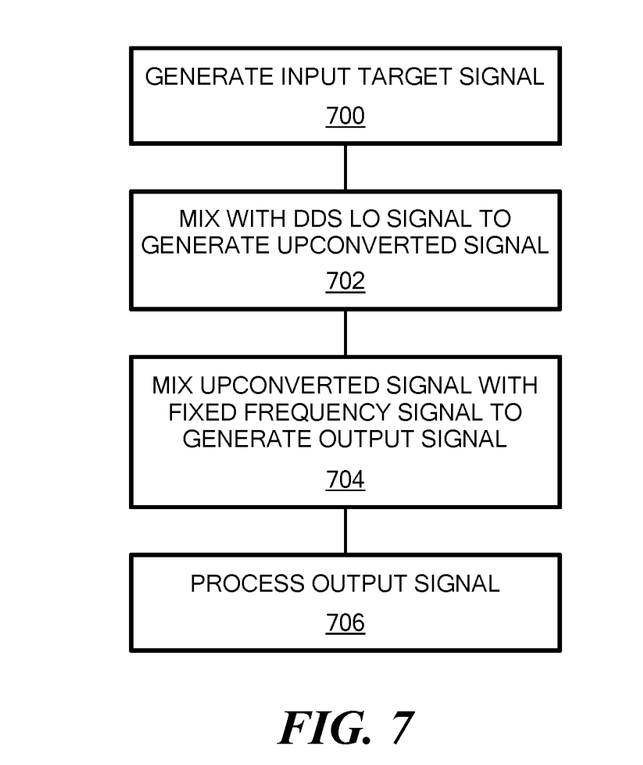
FIG. 7 is a flow diagram showing an example sequence of steps for generating target signals in accordance with example embodiments of the invention.

FIG. 7 shows an example sequence of steps for generating a target return signal in accordance with example embodiments of the invention. In step 700, an input target signal is generated at a first frequency. In step 702, the first target signal is mixed with DDS-based LO signal to generate an output signal at a second frequency having desired phase information derived from the DDS LO signal. In step 704, the output signal at the second frequency is mixed with a fixed frequency LO to generate an output signal at the first frequency. In step 706, the output signal is processed, such as summed.

Figure 8:
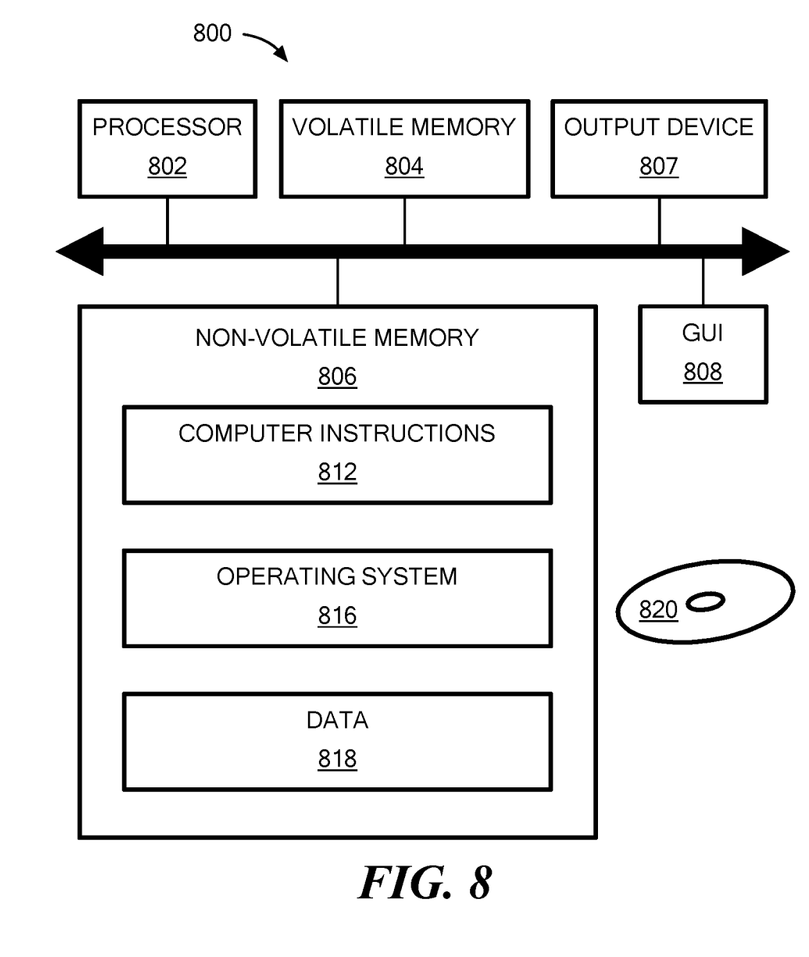
FIG. 8 is a schematic representation of an example computer that can perform at least a portion of the processing described herein.

FIG. 8 shows an exemplary computer 800 that can perform at least part of the processing described herein, such as the processing of FIGS. 2, 3, 4, 5 and 6. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   receiving an input target signal having a first frequency;
   combining the input target signal with an oscillator signal to generate a first output signal having a second frequency, wherein the oscillator signal is generated using a digital component that imparts phase-shift information into the oscillator signal;
   combining the first output signal with a fixed frequency oscillator signal to generate a second output signal corresponding to a signal reflected from a target; and
   supplying the second output signal as a simulated target to an operational radar.

2. The method according to claim 1, wherein the digital component comprises a direct digital synthesizer.

3. The method according to claim 1, wherein the first frequency comprises an intermediate frequency (IF) signal.

4. The method according to claim 1, wherein the input target signal and the oscillator signal are combined using a first frequency mixer.

5. The method according to claim 1, wherein the input target signal is upconverted to the second frequency which comprises an RF signal.

6. The method according to claim 1, wherein the first output signal and the fixed frequency oscillator signal are combined using a second frequency mixer.

7. The method according to claim 1, wherein the first output signal is downconverted.

8. The method according to claim 1, wherein the first output signal is downconverted to an IF signal.

9. The method according to claim 1, wherein the oscillator signal is generated by a first local oscillator and the fixed frequency oscillator signal is generated by a second local oscillator coupled to a reference signal.

10. The method according to claim 1, wherein the digital component comprises a direct digital synthesizer having a phase control register.

11. The method according to claim 10, wherein the direct digital synthesizer includes a frequency control register.

12. The method according to claim 11, wherein the phase control register provides phase control to about $1/100^{th}$ of a degree.

13. A system, comprising:
   a first signal combiner configured to receive an input target signal having a first frequency and an oscillator signal to generate a first output signal having a second frequency, wherein the oscillator signal is generated using a digital component that imparts phase-shift information into the oscillator signal;
   a second signal combiner to combine the first output signal with a fixed frequency oscillator signal to generate a second output signal corresponding to a signal reflected from a target; and
   an interface to supply the second output signal as a simulated target to an operational radar.

14. The system according to claim 13, wherein the digital component comprises a direct digital synthesizer.

15. The system according to claim 13, wherein the first frequency comprises an intermediate frequency (IF) signal.

16. The system according to claim 13, wherein the first signal combiner comprises a first frequency mixer.

17. The system according to claim 13, wherein the input target signal is upconverted to the second frequency which comprises an RF signal.

18. The system according to claim 13, wherein the oscillator signal is generated by a first local oscillator and the fixed frequency oscillator signal is generated by a second local oscillator coupled to a reference signal.

19. The system according to claim 13, wherein the digital component comprises a direct digital synthesizer having a phase control register.

20. The system according to claim 19, wherein the phase control register provides phase control to about $1/100^{th}$ of a degree.

* * * * *